UNITED STATES PATENT OFFICE.

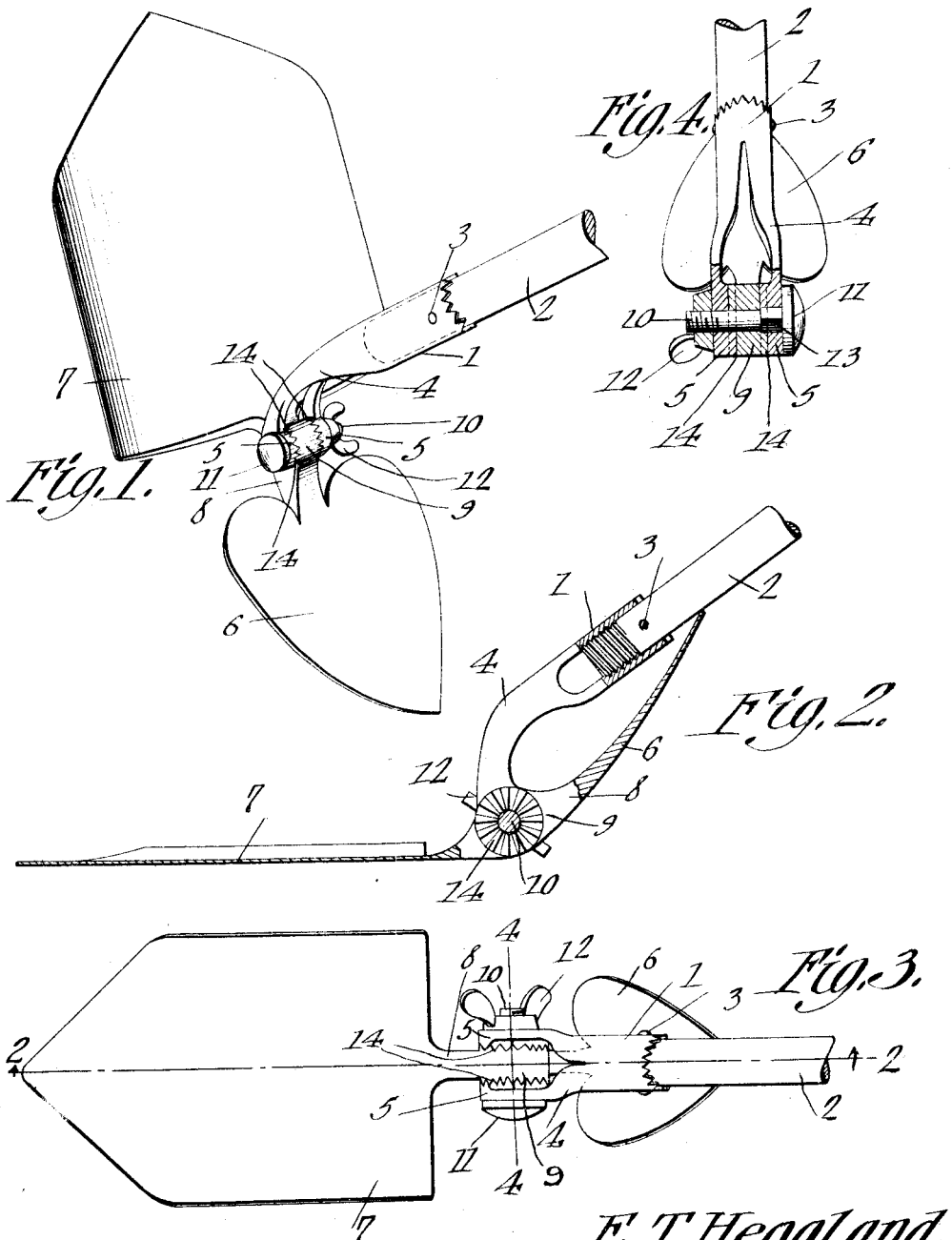

EVEND T. HEGGLAND, OF MINA, NEVADA.

COMBINED HOE AND SHOVEL.

1,181,137.  Specification of Letters Patent.  Patented May 2, 1916.

Application filed January 29, 1915. Serial No. 5,086.

*To all whom it may concern:*

Be it known that I, EVEND T. HEGGLAND, a citizen of the United States, residing at Mina, in the county of Mineral and State of Nevada, have invented a new and useful Combined Hoe and Shovel, of which the following is a specification.

The present invention appertains to agricultural implements, and aims to provide an implement having hoe and shovel blades combined therewith, and adapted to be adjusted to operative position relative to the handle, whereby either of the blades may be employed, and so that the device may be readily converted into either a hoe or a shovel, to thus combine in one implement the said two devices.

It is the object of the invention, to assemble the hoe and shovel blades with the handle in a unique manner, whereby the blades may be readily adjusted, and whereby the implement when used either as a hoe or shovel will be substantial and convenient.

It is also within the scope of the invention, to provide a combination implement of the nature indicated, which is comparatively simple, light, compact, non-encumbering and inexpensive in construction, and which is handy, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in its preferred embodiment in the accompanying drawing, wherein:—

Figure 1 is a perspective view of the implement illustrating the hoe blade in operative position, a portion of the handle being broken away. Fig. 2 is a sectional view of the device, taken approximately on the line 2—2 of Fig. 3, and illustrating the shovel blade in operative position. Fig. 3 is a plan view of the device with the parts arranged as seen in Fig. 2. Fig. 4 is a sectional detail taken on the line 4—4 of Fig. 3.

The present implement embodies a socket or sleeve 1 receiving the end of the handle 2, the said parts being secured together by means of a rivet or other securing element 3 engaged therethrough. The socket 1 is provided with a fork 4 projecting therefrom, the arms or prongs of which are resilient or flexible, and turned or curved to one side or downwardly. The arms or tines of the prong 4 terminate in rounded apertured bearings or eyes 5, which are coaxial.

The hoe and shovel blades 6 and 7, respectively, may be of any suitable formation or contour, and have their butt ends arranged adjacent one another, and their active ends remote from one another, so that the blades project away from each other, the adjacent or butt ends of the blades being united by an integral shank or web 8 which has an upstanding central enlarged bearing portion 9 fitting between the arms 5 of the fork 4. As illustrated, the hoe blade 6 is heart-shaped, and both of the blades are pointed, although it is to be understood that the blades may have rounded or straight active ends or edges, and may be of any ordinary or standard shapes. The portion or bearing 9 of the shank or web 8 is also apertured, and its aperture is in alinement with the apertures of the bearings 5.

The shank 8 of the blades is pivoted or fulcrumed within the fork 4, and to this end a clamping and pivot bolt 10 is engaged through the apertures of the bearings 5 and 9, is provided with a head 11 at one end bearing against one of the bearings 5, while a wing nut 12 is threaded upon the other end portion of the bolt 10 and bears against the other bearing 5, so that when the nut 12 is tightened, it will clamp the bearing or portion 9 of the shank 8 between the bearings 5 of the fork. In this manner, the shank 8 of the blades is pivoted upon the bolt 10 within the fork 4 to enable the blades to be swung to various positions relative to the handle and handle socket. To prevent the bolt 10 from turning when the nut 12 is tightened or loosened, the bolt is provided with a squared or non-circular portion 13 adjacent the head 11 thereof and the aperture of the adjacent bearing 5 is of similar contour, for the reception of the portion 13 to prevent the rotation of the bolt relative to the fork and its bearings.

The faces or sides of the bearing 9 and the inner sides or faces of the bearings 5 are provided with interengageable radial corrugations or teeth 14, whereby when the nut 12 is tightened, to force the bearings 5 toward each other, the corrugations of the adjacent faces or sides of the bearings 5 and 9 will be interengaged for positively holding the blades at the position to which they are adjusted.

The blades 6 and 7 are arranged at an obtuse angle relative to one another, as clearly seen by reference to Fig. 2, so that when the blades are adjusted to the position seen in Fig. 2, with the hoe blade 6 bearing against or disposed adjacent the handle 2, the shovel blade 7 will be in operative position, and the implement may be conveniently employed as a shovel. When the blades are adjusted to the position illustrated in Fig. 1, with the blades arranged at an angle with the handle and handle socket, the implement may serve in the capacity of a hoe, in the ordinary manner. The tension of the arms or prongs of the fork 4 separate them when the bolt 10 is loosened, in order that when the nut 12 is unscrewed, the bearings 5 will separate to release the blades, and whereby the blades may be readily swung to any desired position without interference. As soon as the nut 12 is tightened, the shank 9 of the blades will be clamped in place, to prevent the blades from swinging relative to the handle during the use of the implement, either as a shovel or hoe.

The present implement may be employed for divers purposes, and is especially useful when both a shovel and hoe are necessary, since with the present device, only a single implement need be employed for the hoeing and shoveling operations, and the implement may be readily converted into either a shovel or hoe. In some cases, a single blade only is desirable, in which event either of the blades can be used by itself.

Having thus described the invention, what is claimed is:—

In a combined hoe and shovel, a handle, a socket receiving one end of the handle and having a fork whose arms are curved downwardly at an obtuse angle with the handle, a clamping and pivot bolt engaged through the free ends of said arms, and shovel and hoe blades arranged at an obtuse angle relative to one another and projecting away from each other, the butt ends of said blades being united by a shank flush with the back sides of said blades, and the shank having a portion projecting upwardly within the angle between the blades and journaled upon said bolt between said arms, the free end of the hoe blade being arranged to swing against the handle when the shovel blade is moved to operative position.

In testimony that I claim the foregoing as my own, I have hereto affixed my signature in the presence of two witnesses.

EVEND T. HEGGLAND.

Witnesses:
A. R. NELSON,
THOMAS C. HEIDE.